United States Patent [19]

Ueno

[11] 4,115,809
[45] Sep. 19, 1978

[54] LASER BEAM SYSTEM FOR OPTICALLY RECORDING INFORMATION SIGNALS ON A RECORD DISC

[75] Inventor: Ichiro Ueno, Isehara, Japan

[73] Assignee: Victor Company of Japan, Limited, Yokohama, Japan

[21] Appl. No.: 745,685

[22] Filed: Nov. 29, 1976

[30] Foreign Application Priority Data

Nov. 29, 1975 [JP] Japan .................................. 50-142758

[51] Int. Cl.$^2$ ............................................. H04N 5/76
[52] U.S. Cl. ............................ 358/128; 179/100.3 V;
179/100.4 C
[58] Field of Search ................ 358/128; 179/100.3 V,
179/100.4 C, 100.1 B; 346/107 R, 108, 76 L;
365/120, 124, 215, 106

[56] References Cited
U.S. PATENT DOCUMENTS

| 3,800,099 | 3/1974 | Dickopp et al. ............... 179/100.3 V |
| 3,983,317 | 9/1976 | Glorioso ........................ 179/100.3 V |
| 4,025,949 | 5/1977 | Whitman ............................... 358/128 |
| 4,041,532 | 8/1977 | Plows et al. ......................... 358/128 |

Primary Examiner—Raymond F. Cardillo, Jr.

[57] ABSTRACT

The inventive system optically records information signals on a recording disc. A light source, such as a laser beam, for example, emits a light which is modulated in conformance with an information signal that is to be recorded. An optical system converts this light into a beam having a large width in the longitudinal direction of a track formed on the recording disc. There is a small beam dimension in the transverse direction of the track. A slit plate within the optical system limits the width of the light to cause a constant beam width in the transverse direction of the track. A focusing lens receiving, as incident light, such a limited light beam forms a light spot on the recording disc which is small in the longitudinal direction of the track and large in the transverse direction of the track. The light spot forms a plurality of pits in the upper surface of the recording disc. Each of these pits has a small width in the longitudinal direction of the track and a constant large width in the transverse direction of the track, thereby to record the information signal along the track on the recording disc.

3 Claims, 10 Drawing Figures ically recording information signals on a recording disc, with the above described problems have been overcome.

LASER BEAM SYSTEM FOR OPTICALLY RECORDING INFORMATION SIGNALS ON A RECORD DISC

BACKGROUND OF THE INVENTION

This invention relates generally to systems for optically recording information signals on recording discs and, more particularly, to a system for recording information signals, such as video signals, by a laser beam which forms a plurality of pits on a recording disc.

In general, one known system for recording video signals on a recording disc, employs an optical recording system. The video signals are recorded by a laser beam which forms pits on the recording disc at pitch intervals which conform with the frequency of the signals.

In known optical recording systems of this character, the same light beam width is used in both the longitudinal and the transverse directions of the track. Each pit is the same, and the pitch intervals between the pits cannot be made very small since the circular laser beam spot is used. Consequently, higher frequency signals cannot be satisfactorily recorded.

Furthermore, the size of the spot on the recording disc which is exposed to the laser beam, in general, is greater than a specific value. Therefore, the recording depth of the pits becomes too deep, and the width of the pits correspondingly becomes too large. As a consequence, in these known systems, the exposure spot becomes larger, and the width of the pits in the longitudinal direction of the track becomes larger, in accordance with the frequency of the recording signal. If the size of the exposure spot becomes too large, the record surface around the peripheral edge parts of pits exceeds a specific value. Excavation of the peripheral edge takes place, and the pit width in the track transverse direction also becomes too large. For this reason, the pit width in the track transverse direction varies with the frequency of the recording signal, and the track pitch must be made too large. As a consequence, the rate of utilization of the recording surface of the recording disc has been poor. Moreover, a good reproduction of the recorded signal could not be achieved.

SUMMARY OF THE INVENTION

Accordingly, it is a general object of the present invention to provide a novel and useful system for optically recording information signals on a recording disc in which the above described problems have been overcome.

Another and specific object of the invention is to provide a system for optically recording information signals on a recording disc, with a constant pit width in the track transverse direction, irrespective of the frequencies of the recording signals.

Still another object of the invention is to provide a system for optically recording information signals on a recording disc by forming pits with a laser beam. Here an object is too provide a laser beam spot shape wherein the width in the track longitudinal direction is smaller than the width in the track transverse direction.

Further objects and features of the present invention will be apparent from the following detailed description when read in conjunction with the accompanying drawings.

DETAILED DESCRIPTION

Figure 1:
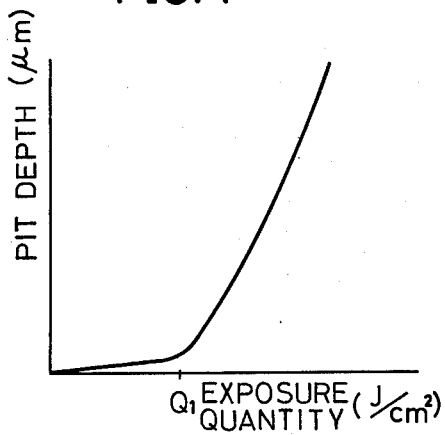
FIG. 1 is a graph indicating the relationship between the size (called "exposure quantity") of the laser beam spot and the depth of pits on a recording disc.

In general, the relationship between the spot size or exposure quantity of a laser light beam on a recording disc and the depth of the pits formed by this laser light beam during recording is as indicated in FIG. 1. For exposure quantities which are less than a specific value Q1, there is almost no pit formation and no recording is accomplished. When the exposure quantity is greater than the specific value Q1, the recording depth increases with increasing exposure.

Furthermore, a Gaussian distribution curve (FIG. 2) indicates approximately the distribution of light beam intensity with respect to the width of the cross section of the laser light beam. That is, the light beam intensity distribution exhibits a curve having a maximum peak of light beam intensity at the central region of the laser beam cross-section. The values of the light beam intensity decrease progressively in the end regions of the cross-section, to gently sloping skirts at the extremities.

Figure 2:
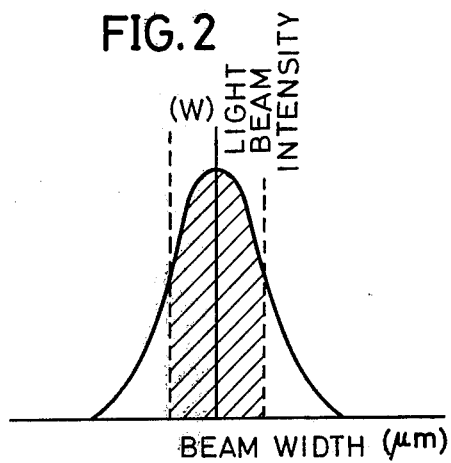
FIG. 2 is a graph indicating the distrubution of the light beam intensity with respect to the width of a laser light beam.

Laser light successively forms pits to record a signal, with the light beam intensity distribution indicated in FIG. 2. The pitch interval of the pits and the pit width in the track longitudinal direction differ with the frequency of the recording signal. For this reason, there may be instances when the exposure quantity (with respect to the record disc) is adversely affected by the light represented by the skirt of the Gaussian curve. The light beam intensity distribution (FIG. 2) exceed the specific exposure quantity Q1, as indicated in FIG. 1. As a consequence, when the laser beam forms a pit for recording on the recording disc, with the light beam intensity indicated in FIG. 2, the pit width and depth also vary, as indicated by curves I and II in FIG. 3. This variance is in accordance with the frequency of the recording signals. This has been a problem in the prior art. The curve I indicates a pit depth d1 and a pit width l1. In the curve II, as the pit depth becomes d2, the pit width also expands to l2.

When the pit width varies with the recording signal in this manner, the track pitch spacing on the recording medium must be selected in conformance with the maximum pit width. The rate of utilization of the recording area of the recording medium becomes poor. When the pit width varies, the recording surface becomes rough, and good reproduction cannot be carried out.

In accordance with the present invention, the above described problems are overcome by an optical recording system which is capable of forming pits having widths which are always constant, irrespective of the recording signal frequency.

Figure 4:
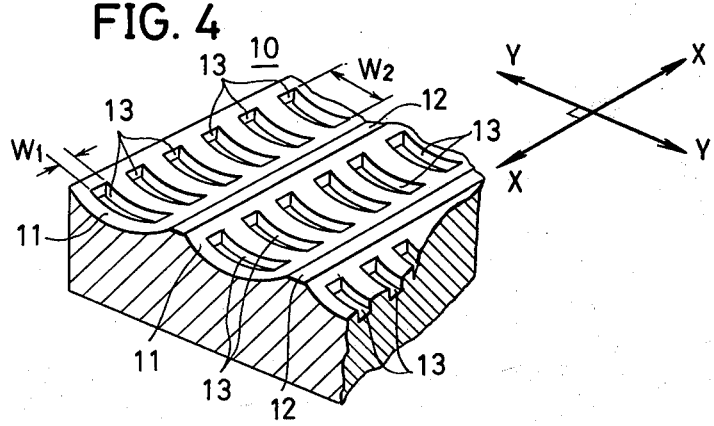
FIG. 4 is a fragmentary perspective view showing pits formed on a recording disc.

FIG. 4 shows a fragmentary portion of a recording disc on which an information signal has been recorded, by the system of the invention. On the upper surface of the recording disc 10, a track 11 is formed along a spiral path. A land (guard band) 12 is left between adjacent tracks 11. The signal has been recorded, on this record disc 10, in a plurality of pits 13 which are formed with a pitch interval and a width W1. The width of the pits extends transversely with respect to the longitudinal direction. The pitch interval is formed in conformance with the recording signal frequency. At the time of reproduction, the nature and existence or nonexistence of a signal is in conformance with the pitch interval and width W1 of the pits. The pitch and width are detected either capacitatively or optically. Here, each pit 13 has a constant width W2 in the transverse direction of the track, as described hereinafter.

In preferred embodiment (FIGS. 5A, 5B) of a recording system according to the present invention, recording is accomplished by forming pits with a constant transvers width W2, will now be described.

Figure 7:
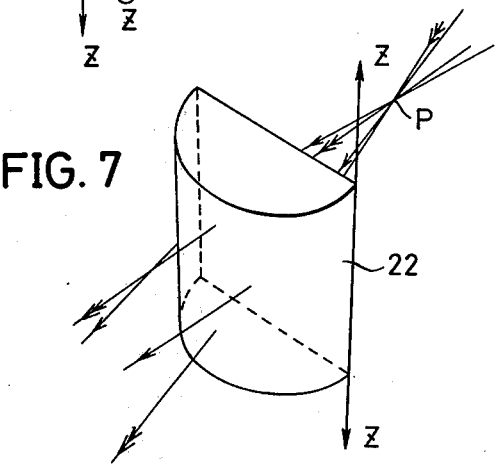
FIG. 7 is a perspective view of a cylindrical lens.

Lens 21 focuses a light beam from a laser source 20 at a point P. Then, the laser beam is projected as incident light into a cylindrical lens 22. The lens 22 is generally a semicircular cylinder, having a plane which is parallel to the centerline axis of the cylinder, as shown in FIG. 7. An axis Z is parallel to the centerline axis of this cylinder and is disposed to coincide with the arrow axis X, in the longitudinal direction shown in FIG. 4.

Figure 5A:
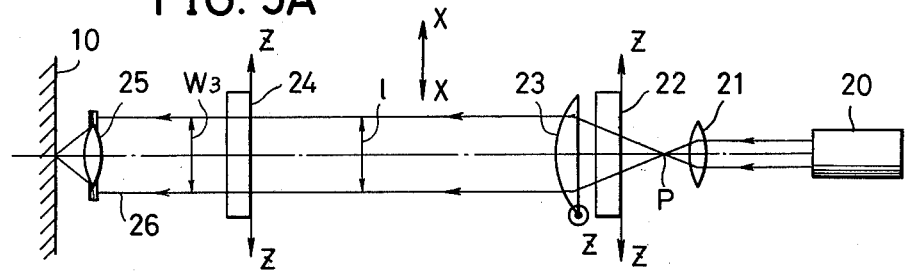
FIGS. 5A and 5B are schematic optical diagrams respectively showing the optical system of one embodiment of the optical recording system according to the invention as viewed in the arrow direction X (track transverse direction) and the arrow direction Y (track longitudinal direction) in FIG. 4.

Since the cylindrical lens 22 does not have a curved surface, in the plane seen in FIG. 5A, the light focused at the point P passes, without change, through lens 22 and enters as incident light into a cylindrical lens 23. On the other hand, since the cylindrical lens 22 has a curved surface, in the plane seen in FIG. 5B, the light focused at the point P is refracted by lens 22 to focus at a point O, in FIG. 5B.

The cylindrical lens 23 is so disposed that an axis Z parallel to its cylindrical centerline axis coincides with arrow axis Y, i.e., in the transverse direction of the track shown in FIG. 4. In FIG. 5A, the light which has passed through the cylindrical lens 22 is bent into parallel-rays by the cylindrical lens 23 and enters as incident light into a cylindrical lens 24. On the other hand, in the plane of FIG. 5B, the light passing through the cylindrical lens 22 is not bent by through the cylindrical lens 23. After once focusing at the point O, this light enters as incident light into the cylindrical lens 24.

Figure 5B:
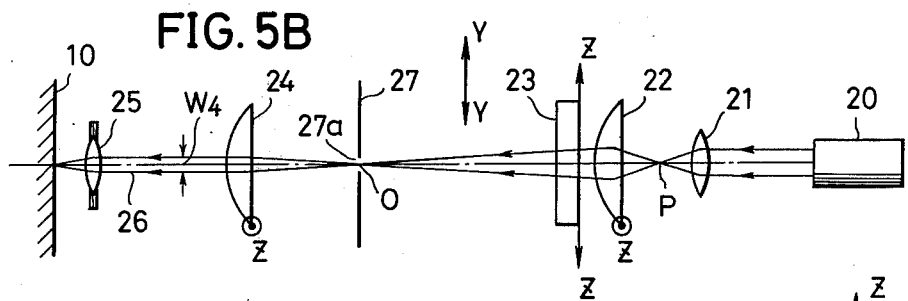

The cylindrical lens 24 is so disposed that an axis Z parallel to its cylindrical axis coincides with the arrow axis X shown in FIG. 4. In the plane of FIG. 5A, the light which has entered as incident light into the cylindrical lens 24 is not bent and enters as incident light into a focusing lens 25. In the plane of FIG. 5B, the light which has entered as incident light from the point O is bent by the cylindrical lens 24 into parallel-rays and is introduced as incident light into the focusing lens 25.

Figure 6:
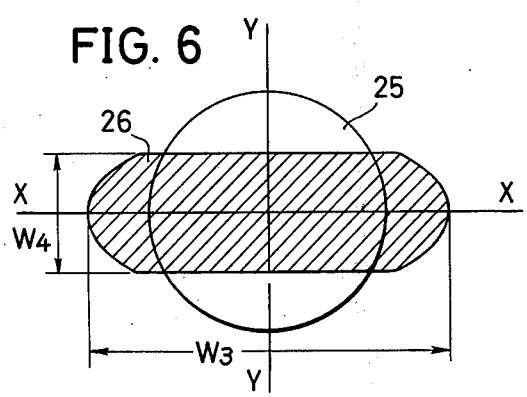
FIG. 6 is a diagram showing a focusing lens and its relationship to a light beam incident thereto.

In the plane of FIG. 5A, the width W3 of the light flux passing from the cylindrical lens 23 through the cylindrical lens 24 and entering the focusing lens 25 is greater than the aperture diameter of the focusing lens 25. Furthermore, in the plane of FIG. 5B, the width W4 of the light flux passing through the cylindrical lens 24 and entering the focusing lens 25 is less than the aperture diameter of the focusing lens 25. Consequently, the relationship between the focusing lens 25 and the cross-sectional shape of the light flux 26 entering this lens 25 is shown in FIG. 6.

In this connection, the radius (airy disc radius) $r$ of a light beam focused by a focusing lens generally is expressed by the following equation:

$$r = 1.22 \times F \times \lambda,$$

where F is the aperture diameter ratio and indicates the so-called F-number, and $\lambda$ is the wavelength of the incident light.

The maximum limit within which light can be focused by a focusing lens is generally proportional to the F-number of the focusing lens. However, as indicated in FIG. 6, the width W4, in the Y-axis direction, of the light flux entering as incident light into the focusing lens 25 is smaller than the diameter of the focusing lens 25. For this reason, the effective or equivalent F-number of the focusing lens 25 is greater than the actual F-number with respect to the light of the width W4 in the Y-axis direction. On the other hand, the width W3 of the light flux in the X-axis direction is equal to or greater than the diameter of the focusing lens. For this reason, the F-number of the focusing lens 25 remains unchanged with respect to the light of the width W3 in the X-axis direction.

Accordingly, the light of the width W3 in the X-axis direction (FIG. 5A) is focused with a narrow width on the recording disc 10, thereby to form pits having a width W1 in FIG. 4. On the other hand, the light of the width W4 in the Y-axis direction (FIG. 5B), as is apparent from the above equation, is focused with a wide width on the recording disc 10, thereby to form pits of the width W2 in FIG. 4. Therefore, recording is carried out by successively forming pits 13 with a broad width W2 in the Y-axis direction, that is, in the transverse direction of the track, and with a narrow width W1 in the X-axis direction, that is, in the longitudinal direction of the track.

Since the pit width in the track longitudinal direction is narrow, a good recording occurs with a high rate of utilization of the recording area of even signals of high frequencies.

In this connection, as shown in FIG. 5B, a slit plate 27, constituting an essential part of the present invention, is disposed in the optical path so that its slit 27a is positioned at the focal point O between the cylindrical lenses 23 and 24. This slit plate 27 limits, to a specific width, the width W4 in the Y-axis direction of the light flux in the plane of FIG. 5B. The slit 27a of plate 27 is a rectangle, for example, of a dimension in the Y-axis direction of the order of 200 μm and a dimension in the X-axis direction of the order of 10 mm. Furthermore, the rims of the slit 27a which determine the width thereof in the Y-axis direction are formed as knife edges.

As a result of this slit plate 27, the width W2 of the pits 13 is continually maintained constant even when there is a fluctuation in the intensity of the light beam from the light source. The pits are formed with fluctuating depth on the recording disc.

Figure 3:
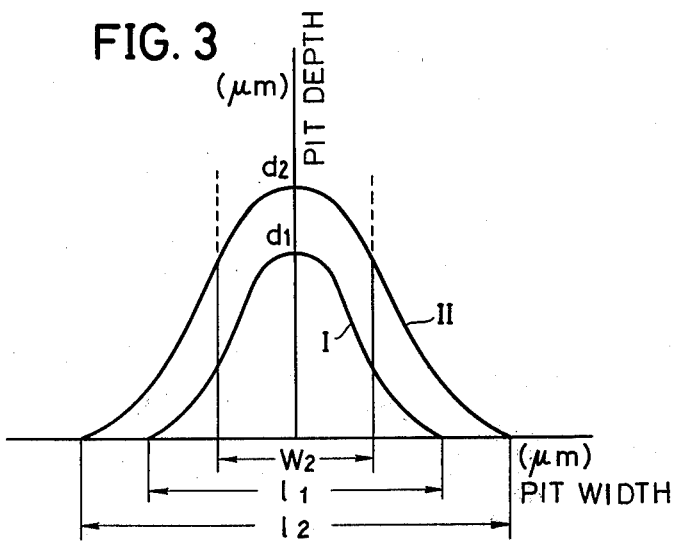
FIG. 3 is a graph indicating the relationships between the width and depth of pits.

By restricting light at slit plate 27, the light represented by hatching or shading and enclosed by two intermittent lines in FIG. 2 is utilized. Thus, the used portion of the light beam has an intensity in the order of 50 to 70 percent of the maximum light beam intensity in the distribution indicated in FIG. 2. The light represented by the skirts of this distribution, which are not hatched, are shut out by the slit plate 27. For this reason, the pit width W2 is continually maintained at a constant value even when the pit depth fluctuates between d1 and d2 as indicated in FIG. 3.

Since the slit plate 27 is disposed at the focal point O, there is almost no light diffraction at the peripheral edges of the slit 27a, and deleterious effects due to diffraction do not arise.

Figure 8A:
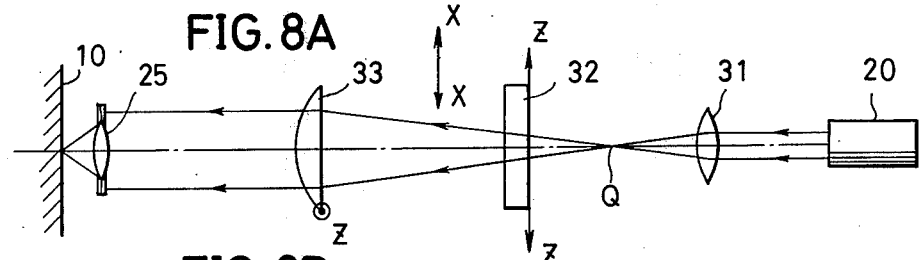
FIGS. 8A and 8B are schematic optical diagrams respectively showing the optical system of another embodiment of the optical recording system according to the invention as viewed in the arrow direction X and the arrow direction Y in FIG. 4.
Figure 8B:
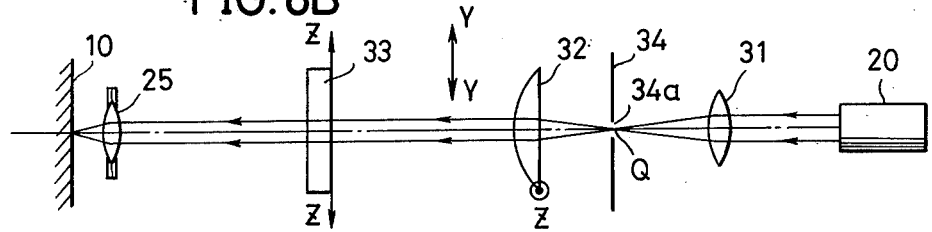

A second embodiment of the present invention is illustrated in FIGS. 8A and 8B. A laser light beam from source 20 is focused at a point Q by a focusing lens 31 thereafter, it enters as incident light into a cylindrical lens 32. This cylindrical lens 32 is so disposed that an axis Z is parallel to its cylindrical centerline axis, which coincides with the arrow axis X in FIG. 4.

The light which has been thus focused at the point Q passes, without change, through the cylindrical lens 32 in FIG. 8A and, becomes parallel-rays in the plane of FIG. 8B, enters as incident light into a cylindrical lens 33. As indicated in the plane of FIG. 8B. This light cylindrical lens 33 is disposed so that an axis Z parallel to its cylindrical centerline axis coincides with the arrow axis Y in FIG. 4. The light which has thus entered cylindrical lens 33 becomes parallel-rays in the plane of FIG. 8A and passes, as parallel-rays, in FIG. 8B, entering as incident light into a focusing lens 25. The light is focused on the recording disc 10 by the focusing lens 25, to form pits of a width W1 in the track longitudinal direction and a constant width W2 in the track transverse direction, as indicated in FIG. 4. This is similar to the preceding embodiment of the invention.

In this system of FIG. 8, a slit plate 34, having a slit 34a, is disposed at the focal point Q between the focusing lens 31 and the cylindrical lens 32. This slit plate 34 is similar to the slit plate 27 in the first embodiment of the invention. It restricts the width of the light in the arrow axis Y direction. Accordingly, pits of a constant width W2 are always formed.

Further, this invention is not limited to these embodiments but various modifications may be made without departing from the scope and spirit of the invention.

What is claimed is:

1. A system for optically recording on a record disc, comprising:
   light source means for emitting a light modulated in conformance with an information signal to be recorded;
   optical system means for converting said light from the light source into a light beam having a relatively large width in the longitudinal direction of a track formed on said recording disc and a relatively small width in the transverse direction of said track;
   slit plate means in said optical system means for limiting the width of said light beam to a constant width in said transverse direction of the track; and
   focusing lens means for receiving as incident light said light beam having a limited width and for forming on said recording disc a light spot which is small in the longitudinal direction of the track and large in the transverse direction of said track;
   said light spot forming in the upper surface of said recording disc a plurality of pits each of which has a small width in the longitudinal direction of the track and a constant large width in the transverse direction of said track, thereby recording said information signal along said track on said recording disc,
   said optical system means having at least one focal point within the optical path, and said slit plate being at the position of said focal point.

2. A recording system as claimed in claim 1 in which said optical system means has at least two cylindrical lenses, each of said lenses having a circular arc in cross section with a flat part extending along a plane parallel to the centerline axis of a circular cylinder containing said arc, one of said cylindrical lenses being disposed with its cylindrical centerline axis parallel to said longitudinal direction of the track, and the other cylindrical lens being disposed with its cylindrical centerline axis parallel to said transvere direction of the track.

3. A recording system as claimed in claim 1 in which an aperture in said slit plate is shaped to shut out parts of said light beam having intensities which are less than 50 to 70 percent of the maximum light beam intensity distribution across the width of said light beam.

* * * * *